United States Patent
Kurz

(10) Patent No.: US 11,956,699 B2
(45) Date of Patent: Apr. 9, 2024

(54) MONITORING DEVICE DETECTION SYSTEM AND METHOD

(71) Applicant: Transportation IP Holdings, LLC, Norwalk, CT (US)

(72) Inventor: Brian Kurz, Thurmont, MD (US)

(73) Assignee: Transportation IP Holdings, LLC, Norwalk, CT (US)

( * ) Notice: Subject to any disclaimer, the term of this patent is extended or adjusted under 35 U.S.C. 154(b) by 257 days.

(21) Appl. No.: 17/203,466

(22) Filed: Mar. 16, 2021

(65) Prior Publication Data

US 2021/0297825 A1 Sep. 23, 2021

Related U.S. Application Data

(60) Provisional application No. 62/993,274, filed on Mar. 23, 2020.

(51) Int. Cl.
| | |
|---|---|
| *H04W 4/38* | (2018.01) |
| *F16B 45/00* | (2006.01) |
| *F16M 13/02* | (2006.01) |
| *G07C 5/00* | (2006.01) |

(52) U.S. Cl.
CPC .............. *H04W 4/38* (2018.02); *F16B 45/00* (2013.01); *F16M 13/02* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 4,691,563 A | 9/1987 | Martin | |
| 4,876,885 A | 10/1989 | Martin et al. | |
| 5,235,849 A | 8/1993 | Egerton | |
| 9,982,836 B2* | 5/2018 | Wallace | H01Q 1/20 |
| 2005/0205719 A1* | 9/2005 | Hendrickson | B61L 15/0081 246/122 R |
| 2007/0145196 A1* | 6/2007 | Davenport | B61L 15/02 246/1 C |
| 2007/0216771 A1* | 9/2007 | Kumar | B61L 27/53 348/148 |
| 2009/0013507 A1* | 1/2009 | Scott | F16B 2/10 24/502 |
| 2009/0014402 A1* | 1/2009 | Wolf | A63H 19/18 213/75 TC |
| 2010/0148013 A1* | 6/2010 | Bhotika | B61G 7/14 246/1 C |
| 2016/0052453 A1* | 2/2016 | Nalepka | H04N 5/44 348/148 |
| 2017/0137043 A1* | 5/2017 | Barnes | B61G 7/14 |
| 2017/0146996 A1* | 5/2017 | Smith | B61L 15/0036 |

(Continued)

FOREIGN PATENT DOCUMENTS

CN 107685743 A * 2/2018 ............... B61G 9/00

*Primary Examiner* — Muhammad Adnan
(74) *Attorney, Agent, or Firm* — Mary D. Lawlor; The Small Patent Law Group, LLC

(57) ABSTRACT

A monitoring device detection system may include a mounting assembly disposed onboard a vehicle system. The mounting assembly couples a vehicle signaling and monitoring device to the vehicle system. One or more sensors may obtain information related to one or more of the mounting assembly or the vehicle system. One or more processors may determine a state of the mounting assembly based on the information obtained by the one or more sensors.

20 Claims, 5 Drawing Sheets

(56) References Cited

U.S. PATENT DOCUMENTS

| | | | |
|---|---|---|---|
| 2017/0151965 A1* | 6/2017 | Brooks | B61L 15/0081 |
| 2018/0158542 A1* | 6/2018 | Kim | A61B 5/6807 |
| 2018/0249228 A1* | 8/2018 | Yoshikawa | H04L 61/5038 |
| 2018/0312179 A1* | 11/2018 | Lucisano | B61L 15/0081 |
| 2019/0009715 A1* | 1/2019 | Gage | H04W 4/90 |
| 2019/0071107 A1* | 3/2019 | Cooper | B61L 27/70 |
| 2019/0100224 A1* | 4/2019 | Cox | B61G 7/10 |
| 2019/0111899 A1* | 4/2019 | Lange, III | H01R 13/665 |
| 2019/0152282 A1* | 5/2019 | Spengler | B60D 1/62 |
| 2019/0315170 A1* | 10/2019 | Williams | H04W 4/80 |
| 2020/0076214 A1* | 3/2020 | Mifsud | H02J 7/0045 |
| 2020/0189631 A1* | 6/2020 | Gorman | B61L 15/0072 |
| 2020/0226902 A1* | 7/2020 | Mandaric | G06F 9/445 |
| 2021/0149280 A1* | 5/2021 | Tuo | F16M 11/123 |
| 2021/0297825 A1* | 9/2021 | Kurz | H04W 4/40 |

\* cited by examiner

MONITORING DEVICE DETECTION SYSTEM AND METHOD

CROSS-REFERENCE TO RELATED APPLICATIONS

This application claims priority to U.S. Provisional Application No. 62/993,274, filed Mar. 23, 2020, and is incorporated by reference herein in its entirety.

BACKGROUND

Technical Field

The subject matter described relates to vehicle monitoring systems and methods.

Discussion of Art

Vehicle signaling and monitoring devices may be coupled with vehicle systems as the vehicle systems move along routes. The monitoring devices may monitor the vehicle systems and/or the routes along which the vehicle systems move. Optionally, the monitoring devices may be transferrable devices that may be moved from one vehicle to another vehicle, from one vehicle system to a storage facility, from a storage facility to a maintenance facility, or the like.

One technical problem of existing systems and methods is an inability to quickly and easily track large volumes (e.g., hundreds) of these monitoring devices. The devices may only report locations when the devices are activated. The devices may be deactivated when not in use and cannot report locations while deactivated. Additionally, tracking relies on human operators to record and report current locations, but given the large numbers of devices and frequent swapping out of devices, locations and statuses are rarely tracked or recorded accurately or in a timely manner.

For example, when monitoring devices are not in use by vehicle systems, the extra devices may be stored at a storage facility, railyard, or warehouse. However, unless a monitoring device is activated, an operator may not know how many devices are available for use, how many devices are in need of maintenance or repair, or how many devices may be unavailable because the devices are assigned to other vehicle systems. For example, an operator may believe that five hundred (500) monitoring devices are available for use, however, only four hundred (400) may actually be available for use because fifty may require repair or and fifty may be deactivated but assigned to or are coupled with other vehicle systems.

BRIEF DESCRIPTION

In one or more embodiments, a system may include a mounting assembly configured to be disposed onboard a vehicle system. The mounting assembly is also configured to couple a vehicle signaling and monitoring device to the vehicle system. The system also includes one or more sensors configured to obtain information related to one or more of the mounting assembly or the vehicle system. The system also includes one or more processors configured to determine a state of the mounting assembly based on the information obtained by the one or more sensors.

In one or more embodiments, a method may include obtaining information related to one or more of a mounting assembly or a vehicle system with one or more sensors coupled with one or more of the mounting assembly or the vehicle system. The mounting assembly may be disposed onboard the vehicle system. The mounting assembly may couple a vehicle signaling and monitoring device to the vehicle system. The method may include determining a state of the mounting assembly based on the information obtained by the one or more sensors.

In one or more embodiments, a system includes an end-of-vehicle device having a housing, a monitoring device disposed in the housing and configured to monitor one or more of a vehicle system or a route along which the vehicle system moves, and a mounting assembly attached to the housing and configured to couple the housing to an exterior end of the vehicle system. One or more sensors may be coupled to the end-of-vehicle device, which are configured to generate sensor signals and communicate the sensor signals with one or more processors. The sensor signals may include information about the end-of-vehicle device for the one or more processors to determine a state of the end-of-vehicle device based on the information.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to systems and methods that enable controllers to determine different states of vehicle signaling and monitoring devices based on information received from one or more sensors that obtain information related to the monitoring device and/or vehicle systems. The different states may indicate whether the monitoring device is in a fully locked or fully loaded position relative to the vehicle system, or if the device is not in a fully locked of fully loaded position relative to the vehicle system. For example, the sensors may generate and communicate sensor signals that indicate to an operator of the vehicle system that the monitoring device is slipping off of the vehicle system to which it is coupled.

The different states may indicate whether the monitoring device is coupled with a vehicle system, or is not coupled with a vehicle system. For example, sensor signals generated by sensors of the monitoring device may correlate with sensor signals generated by sensors of the vehicle system.

One or more processors may determine that the monitoring device is onboard and/or coupled with the vehicle system based on the correlated sensor signals. Alternatively, one or more processors may determine that the monitoring device is not onboard a vehicle system based on correlated sensor signals.

Optionally, the different states may indicate whether the monitoring device off-board the vehicle system is available for use, or is not available for use. For example, the monitoring device may be unavailable for use because the monitoring device requires maintenance or repair. Optionally, the monitoring device may be unavailable for use because the monitoring device has been assigned to another vehicle system.

While some embodiments described herein relate to rail vehicle systems, positive train control systems, and wayside devices, not all embodiments of the inventive subject matter are restricted to rail vehicles, positive train control systems, or wayside devices. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. Additionally, the vehicle systems may include two or more different types of vehicles that may operate as a common vehicle system and that may communicate with each other via the off-board database. For example, the vehicle system may comprise a rail vehicle that may communicate with an unmanned aerial vehicle via the off-board database, or an aircraft that communicates with a marine vessel.

Figure 1:
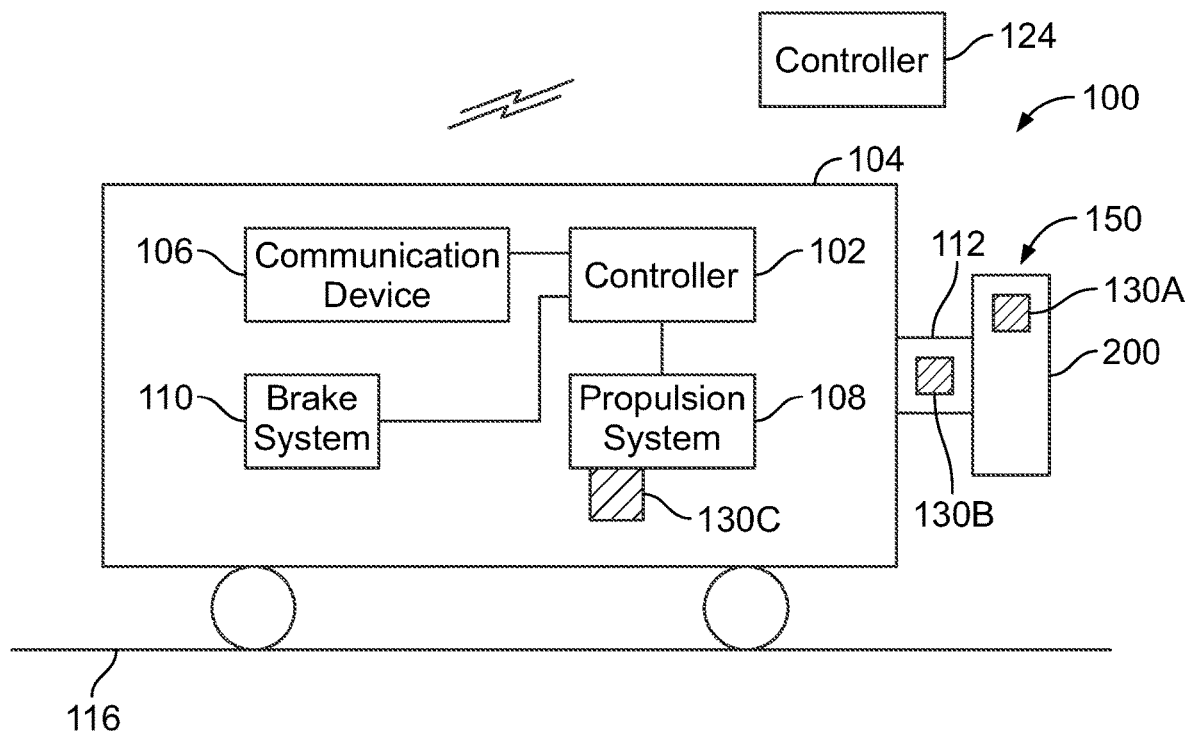
FIG. 1 schematically illustrates one example of a system.

FIG. 1 illustrates one example of a system 100 that includes a vehicle system 104. The vehicle system can be a rail vehicle system, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate but communicating with each other to travel together, such as in a convoy). The vehicle system travels along a route 116, such as tracks, roads, highways, land-based paths, airborne paths, waterways, or the like.

The vehicle system includes a controller 102, which may be referred to as an onboard controller. The onboard controller can represent hardware circuitry that includes and/or is connected with one or more processors that perform operations described in connection with the onboard controller. The onboard controller can communicate with onboard and/or off-board components via a communication device 106. The communication device represents transceiving circuitry, one or more antennas, modems, or the like. In one or more embodiments, the communication device may receive and provide the data signals to the onboard controller. The communication device may be the same as or similar to other communication devices described herein.

The vehicle system includes a propulsion system 108 that operates to move the vehicle system along the route. The propulsion system can represent one or more engines, motors, transmissions, propellers, or the like, that generate propulsion to move the vehicle system. The vehicle system also can include a brake system 110 that operates to slow or stop movement of the vehicle system. The brake system can include air brakes, friction brakes, motors (e.g., used for dynamic or regenerative braking), or the like. The onboard controller can communicate control signals with the propulsion system and/or the brake system to control or change movement of the vehicle system.

In one or more embodiments, the vehicle system may include one or more energy storage devices that store and/or generate electric current. This current can be used to power components onboard the vehicle system, such as the propulsion system, a lighting system, or the like. Optionally, the energy storage devices can include or represent one or more motors of the propulsion system and/or the brake system (e.g., where the motors generate current during regenerative braking). The energy storage devices can include one or more batteries, fuel cells, photovoltaic devices, flywheels, alternators, generators, or the like. The onboard controller can communicate control signals to the energy storage devices to control supply of the current to one or more components of the vehicle system.

An off-board controller 124 may communicate with the onboard controller of the vehicle system. The off-board controller can represent hardware circuitry that includes and/or is connected with one or more processors that perform operations of the off-board controller. In one or more embodiments, the off-board controller can communicate with the onboard controller of the vehicle system to control or restrict movement of the vehicle system. For example, the off-board controller can communicate with the onboard controller of the vehicle system to notify the vehicle system where the vehicle system is allowed to travel, how fast the vehicle system is allowed to travel, or the like.

In one embodiment, the off-board controller may represent a back-office server of a positive vehicle control (PVC) system. A PVC system is a control system in which a vehicle system is allowed to move, and/or is allowed to move outside a designated restricted manner (such as above a designated penalty speed limit), only responsive to receipt or continued receipt of one or more signals (e.g., received from off-board the vehicle) that meet designated criteria, e.g., the signals have designated characteristics (e.g., a designated waveform and/or content) and/or are received at designated times (or according to other designated time criteria) and/or under designated conditions. This is opposed to 'negative' vehicle control systems where a vehicle is allowed to move unless a signal (restricting movement) is received. The back-office server may be a vital or a non-vital system such that data stored, contained, maintained, communicated between, or the like, may be vital (e.g., protected) and/or non-vital (e.g., non-protected) data. Alternatively, the off-board controller represents another computerized system that communicates with vehicle systems described herein.

A mounting assembly 150 may couple a vehicle signaling and monitoring device 200 with the vehicle system via a coupler device 112. The vehicle signaling and monitoring device may also be referred to as an end-of-train (EOT) or end-of-vehicle (EOV) device. The EOV device includes a housing and a monitoring device disposed within the housing. The EOV monitoring device may monitor the vehicle system and/or the route along which the vehicle system moves. In one or more embodiments, the vehicle system to which the monitoring device is coupled can be referred to as an end-of-train (EOT) vehicle or end-of-vehicle (EOV) vehicle. The EOT device may be a transferrable device that may be moved from one vehicle to another vehicle that may change the designation of the respective vehicle from which the EOT device is removed, and the other vehicle where the EOT is moved to may be identified as a new EOT vehicle.

The vehicle system, the coupler device, and the vehicle signaling and monitoring device includes one or more sensors 130A-C. The sensors can detect characteristics of the vehicle system, the vehicle, the monitoring device, and/or the route. For example, the sensors can detect characteristics of the vehicle system such as, but not limited to, if the vehicle system is stationary or moving, operating parameters of the moving vehicle system (e.g., a speed, direction, or the like), a geographic location of the vehicle system, or the like. The sensors can detect characteristics of the monitoring device such as, but not limited to, if the monitoring device is in a fully open or fully closed position, a location of the device, a health score or index of the device, or the like. The sensors can detect characteristics of the route such as, but not limited to, identifications, locations, and/or statuses of wayside devices disposed along the route, route gradients, or the like.

The sensors 130 can generate and communicate one or more sensor signals with the onboard controller and/or the off-board controller. The onboard controller may determine states of the vehicle system, the mounting assembly, the monitoring device, or the like, based on the sensor signals. As one example, the controller may determine that the vehicle signaling and monitoring device is unavailable for use because the monitoring device is in a fully closed position and is coupled with the vehicle system based on correlating sensor signals indicating that monitoring device is in a closed position, sensor signals indicating that the monitoring device is proximate the vehicle system, and sensor signals indicating that the vehicle system is moving. As another example, the controller may determine that the monitoring device is unavailable for use and requires attention by an operator because the monitoring device is not in a fully closed position and is coupled with the vehicle system. As another example, the controller may determine that the monitoring device is unavailable for use because the location of the monitoring device is within or at a repair or maintenance facility. Optionally, the controller may determine that the monitoring device is unavailable for use because the sensor signals indicate that the monitoring device is not operating correctly and needs repair or maintenance.

In one or more embodiments, the onboard controller may communicate the sensor signals and/or information about the determined states to the off-board controller. For example, the onboard controller may communicate the sensor signals to the off-board controller, and the off-board controller may determine states of vehicle system, the mounting assembly, the monitoring device, or the like, based on the sensor signals. The state of the vehicle system may refer to whether the vehicle system is moving or stationary, a geographic location of the vehicle system, a health of the vehicle system, or the like. The state of the monitoring device may refer to a position of the monitoring device with respect to the coupler device, a position of the monitoring device with respect to the vehicle system, a position of one or more components of the monitoring device (e.g., in an open position, in a fully closed position, etc.), a health of the monitoring device (e.g., in need of repair, low battery, or the like), or the like. The state of the coupler device may refer to a position of the monitoring device with respect to the coupler device (e.g., fully coupled, partially coupled, disconnected, or the like), or the like.

In one or more embodiments, the onboard controller may correlate the sensor signals from sensors sensing characteristics of two or more of the vehicle system, the monitoring device, and the coupler device with each other to determine the state of the monitoring device with respect to the vehicle system and/or the coupler device. For example, the onboard controller may receive sensor signals from a sensor 130C indicating that the vehicle system is moving, and may receive sensor signals from a sensor 130A indicating that the vehicle signaling and monitoring device is coupled with the vehicle system. The onboard controller may determine that the monitoring device is coupled with the vehicle system as the vehicle system is moving along the route. As another example, the sensors 130A and 130B may represent contact switches, and the onboard controller may receive sensor signals from the sensors 130A and 130B indicating that the sensors are in contact or within a predetermined proximity to each other. The onboard controller may determine that the vehicle signaling and monitoring device is disposed onboard the vehicle system based on the sensor signals from the sensors.

In one or more embodiments, the sensor signals may indicate if the vehicle signaling and monitoring device is available for use by a vehicle system or is unavailable for use by a vehicle system. The monitoring device may be unavailable for use because the monitoring device is already in use by another vehicle system, is in need of maintenance, or the like. As one example, the off-board controller may receive sensor signals from one or more of the sensors 130A-C and/or sensor signals from one or more other sensors disposed off-board the vehicle system (not shown). For example, the off-board controller may receive sensor signals from a contact sensor at a storage facility and sensor signals from a contact sensor of the vehicle signaling and monitoring device. The sensor signals may indicate that the vehicle signaling and monitoring device is disposed at the storage facility, that the monitoring device is not disposed onboard the vehicle system, or that the monitoring device is not disposed onboard another vehicle system.

Figure 3:
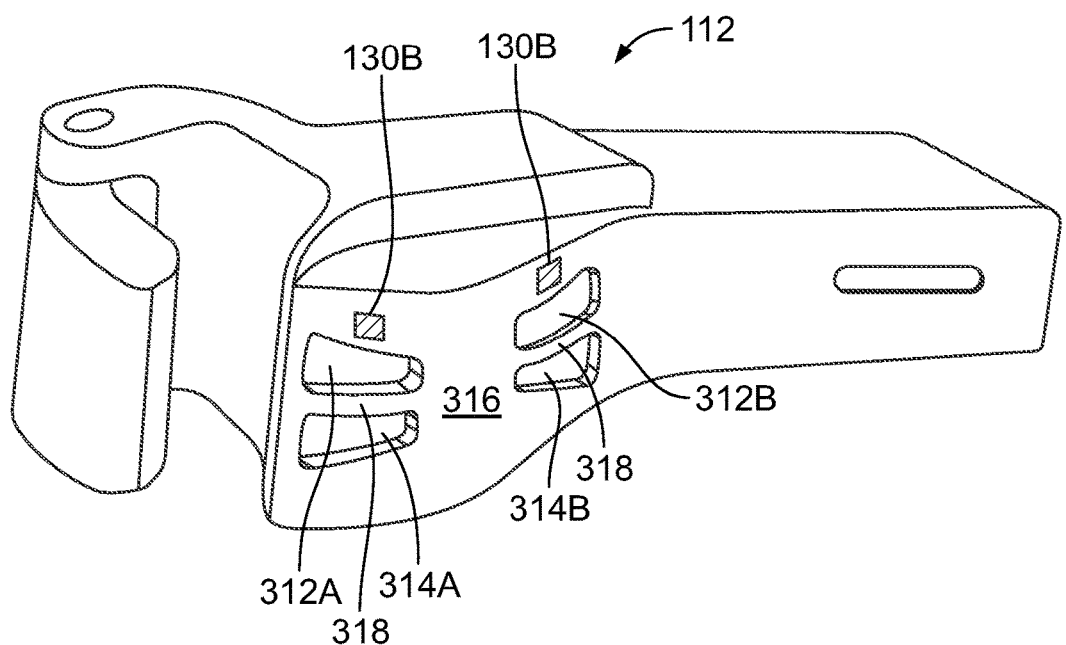
FIG. 3 illustrates a coupler device in accordance with one embodiment.
Figure 2:
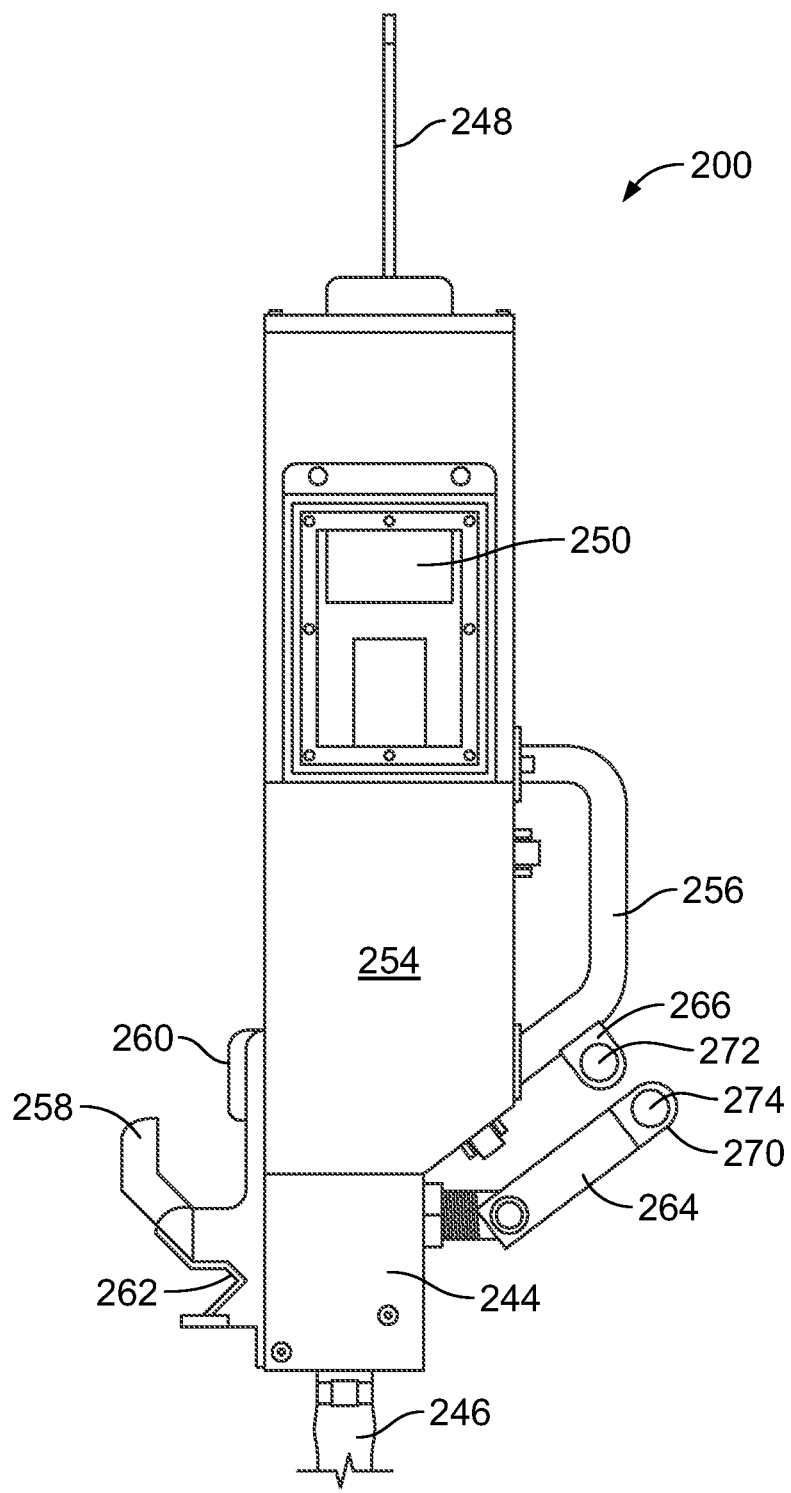
FIG. 2 illustrates a vehicle signaling and monitoring device in accordance with one embodiment.
Figure 4:
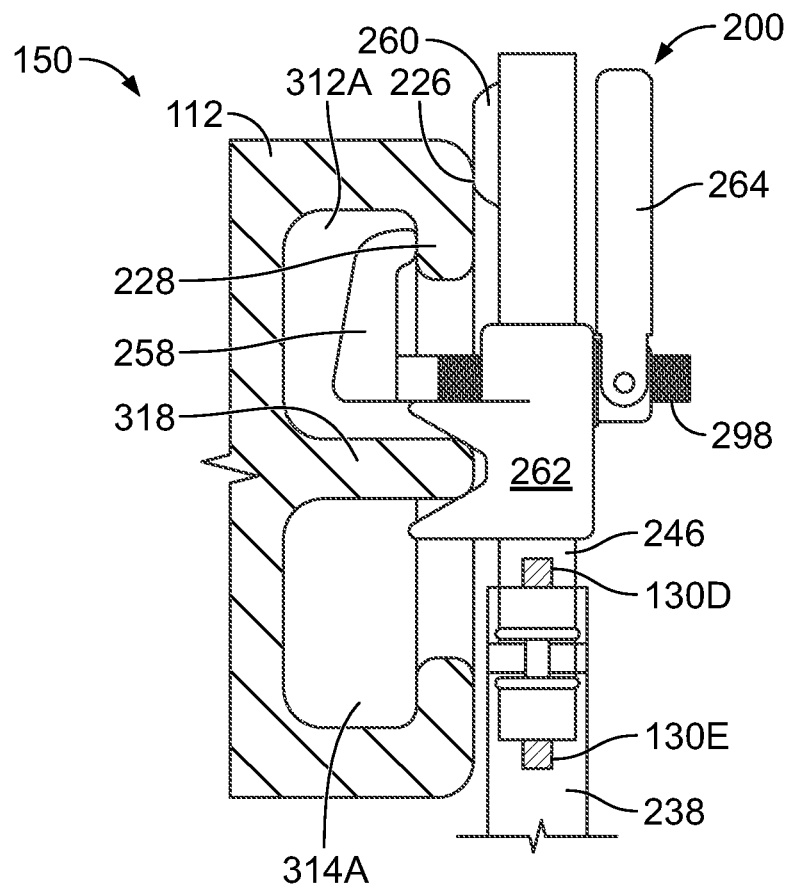
FIG. 4 illustrates a mounting assembly of the system shown in FIG. 1 in accordance with one embodiment.

FIG. 2 illustrates a front view of the vehicle signaling and monitoring device in accordance with one embodiment. FIG. 3 illustrates one example of the coupler device. FIG. 4 illustrates one embodiment of the mounting assembly comprising the vehicle signaling and monitoring device coupled with the coupler device.

The coupler device is one example of a device that is disposed onboard the vehicle system and enables coupling of the monitoring device with the vehicle system. In one or more alternative embodiments, the coupler device may have an alternative shape, size, orientation, configuration, or the like. In the illustrated embodiment of FIGS. 3 and 4, the coupler device includes four core holes 312a, 312b, 314a, 314b that are interconnected to provide passages underneath a central region 316 and are divided from each other by a rib 318.

The monitoring device may include a first member (e.g., first engagement member), a second member (e.g., second engagement member), and a handle. The first and second engagement members are configured to engage the vehicle under actuation of the handle. For example, the first member, the second member, and the handle may be configured to that after attaching the first member to the vehicle (e.g., by inserting it in a hole in the vehicle, or around a stanchion or protuberance on the vehicle), actuating the handle causes the second member to move relative to the first member, to couple and decouple the monitoring device with the vehicle system (e.g., via clamping).

For example, the monitoring device may include a first member 258 that fits within one of the core holes of the coupler device. A second member 262 rides on a rib 318 that separates the core holes 312a, 312b. In one or more embodiments, the first member may be a hook or hook member, and the second member may be a jaw or jaw member. The monitoring device includes a pad 260 that abuts against a side wall 262 of the coupler device. When the hook is tightened against the inside upper lip 228 of the core hole, the pad becomes braced against the top side wall and the jaw member becomes engaged with the rib to provide at least three points of contact with the coupler device. For example, the hook moves relative to the jaw member with actuation of the handle to couple and decouple the monitoring device with the vehicle system. Alternative examples of the first and second members include two clamp members, two jaw members, insertable elements other than hooks, etc.

The monitoring device includes a coupler mount or housing 244 and hose connections 246. The hose connection may be coupled with or connected to brake line hose connections 238 while the monitoring device is coupled with the vehicle system. The monitoring device may include an antenna 248 for communicating with the onboard controller, the off-board controller, and any alternative system. For example, the monitoring device may communicate vehicle operating information to an operator onboard the vehicle system, or an operator of the off-board controller. The monitoring device may include a light 250, an input and/or output device 252 for use by an operator to manually control one or more operations, settings, or the like, of the monitoring device. An energy compartment, such as a battery system, may be accessed by a door 254. A carrying handle 256 may be provided to allow an operator or machine to transport and install the monitoring device from a storage facility to the vehicle system, from one vehicle to another vehicle of the same vehicle system, from one vehicle system to a different vehicle system, or the like.

Figure 5:
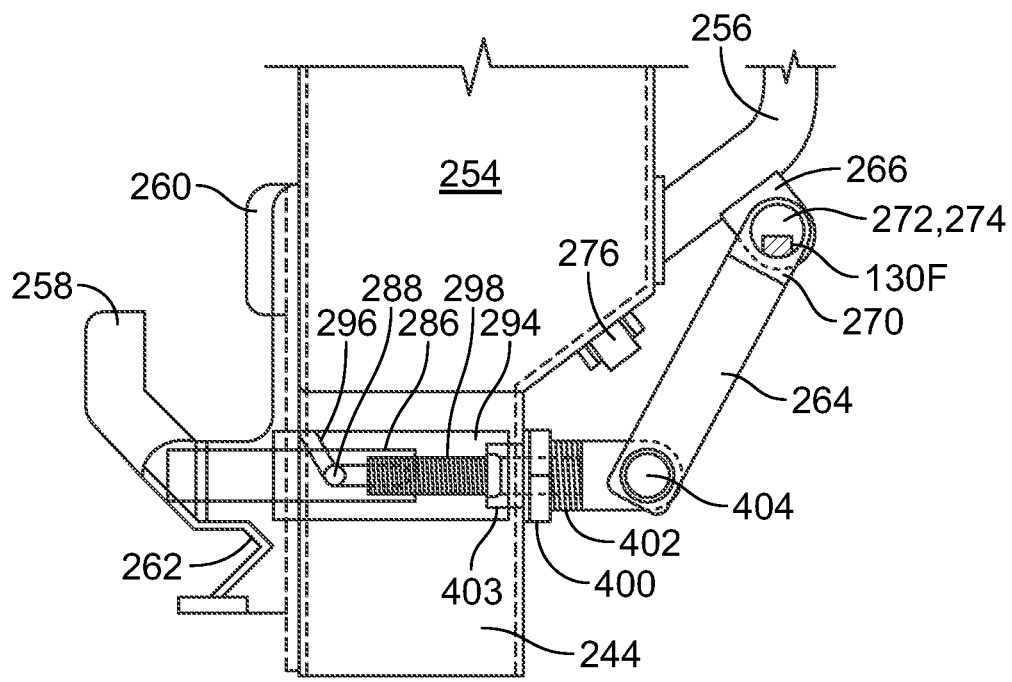
FIG. 5 illustrates a cross-sectional view of a vehicle signaling and monitoring device in accordance with one embodiment.
Figure 6:
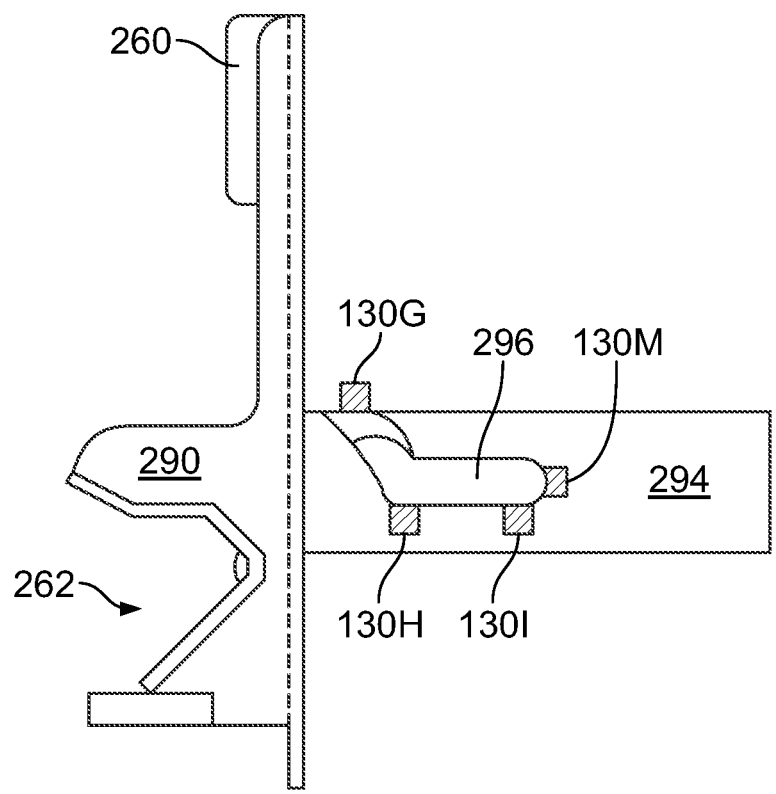
FIG. 6 illustrates a portion of the vehicle signaling and monitoring device shown in FIG. 5 in accordance with one embodiment.
Figure 7:
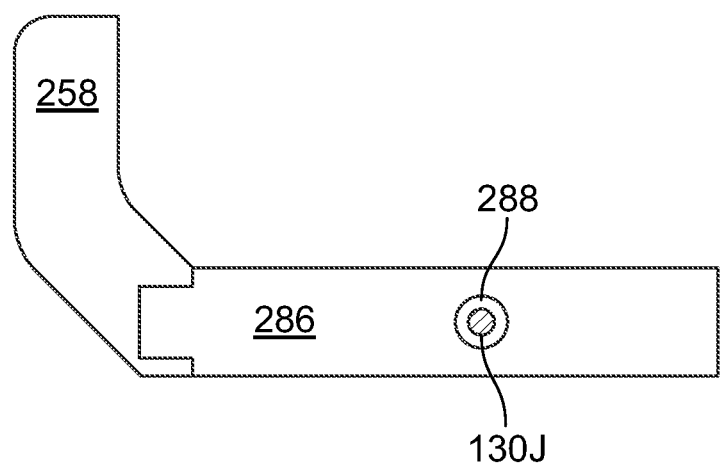
FIG. 7 illustrates a portion of the vehicle signaling and monitoring device shown in FIG. 5 in accordance with one embodiment.

FIG. 5 illustrates a cross-sectional view of the vehicle signaling and monitoring device. FIG. 6 illustrates a portion of the mounting assembly of the monitoring device. FIG. 7 illustrates another portion of the mounting assembly of the monitoring device.

The hook 258 is connected to a tube 286 which has a pin 288 projecting outward from an exterior surface of the tube. A bracket 290 shown in FIG. 6 includes a jack tube 294 with a guide slot 296. The jack tube and the guide slot cooperate with the outwardly extending pin on the tube connected to the hook. The hook is rotated and drawn inward or moved outward relative to the pad 260 by rotating the handle 264. The handle is connected to a screw 298 via a pin 404. The screw passes through a washer stack 402 and nut 400, and is retained in the nut by a retaining ring 403. The nut extends into the jack tube and provides a base for the screw to bear against. The screw is connected to threads in a rear opening of the tube.

As the handle is rotated, the screw causes the tube to be drawn inward or moved outward, thereby moving the hook toward or away from the pad 260. The handle does not directly rotate the hook, rather the rotation of the hook is accomplished by the pin of the tube riding in the slot of the jack tube. To couple the monitoring device to the coupler device or any other device, actuation of the handle may cause the hook to move between one or more unloaded positions and a fully loaded position. For example, the handle is rotated that translates to initial travel of the hook from a transverse position to an upright position. For example, the pin slides down and along the slot in the jack tube and rotates the hook from the transverse position to the upright position. From the upright position, the hook moves inward via additional rotation of the handle until the inside upper lip coupler device is sandwiched between the hook and the pad. In one or more embodiments, the hook, jaw member, and the linkage between the handle and the hook may be referred to as the mounting assembly. The mounting assembly may mount or couple the end-of-vehicle monitoring device with an exterior surface of a vehicle system.

In one or more embodiments, the monitoring device may be locked in a loaded position to lock the hook in engagement with the upper lip of the coring hole. As one example, the handle may be locked by passing a lock (not shown) through apertures 272, 274 of tabs 266, 270, respectively.

To decouple the monitoring device from the coupler device or any other device, the handle is rotated, such as in an opposite direction. The initial movement of the hook is in a direction away from the coupler device, such that a space or gap is disposed between the hook and the inside upper lip coupler device. As the handle is rotated, the pin moves along the slot in the jack tube and rotates the hook from the upright position to the transverse position. In one or more embodiments, the monitoring device may include different linkage or a different linkage configuration between the hook and the handle. Optionally, the monitoring device may be coupled with another component of the vehicle system.

The sensors 130 may be disposed at one or more positions relative to the vehicle system, the vehicle signaling and monitoring device, the coupler device, or the like. In the illustrated embodiment of FIGS. 1 through 8, the sensors coupled with the propulsion system, the brake system, at one or more locations on or within the vehicle signaling and monitoring device, and at one or more locations on or within the coupler device. The sensors may represent one or more different types or kinds of sensors that may sense, or otherwise detect, characteristics of the vehicle system, the monitoring device, the route, wayside devices, geographic information, or the like. Nonlimiting examples of the different types of sensors may include position sensors, light sensors, pressure sensors, accelerometers, magnetic sensors, contact switches, or the like.

Figure 8:
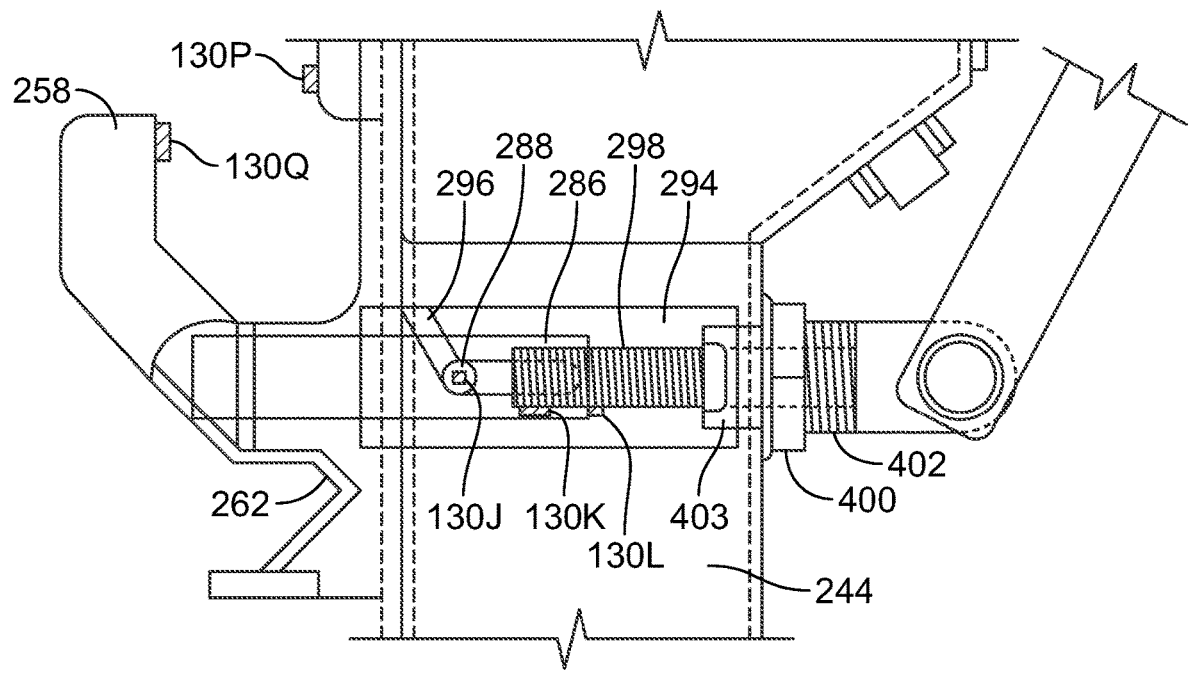
FIG. 8 illustrates a magnified view of the vehicle signaling and monitoring device shown in FIG. 5.

In one or more embodiments, two or more different sensors may operate together. As one example, as illustrated in FIG. 8, a position sensor 130J coupled with the pin 288 may be in communication with one or more of sensors 130G, 130H, 130I coupled with or disposed within the slot 296 such that the sensors 130 may indicate the travel of the pin along the slot. The sensors may be proximity and/or contact switches that may indicate to the processors of the onboard controller and/or the off-board controller a position of the pin within the slot. Based on the information communicated from the sensors, the processors may determine if the mounting assembly is in a fully open position, a fully closed position, or a position between a fully open and fully closed position. Optionally, the position sensor 130J may communicate with one or more of sensors 130K, 130L coupled with the screw to determine a position of the pin relative to different positions of the screw.

As another example, one of the sensors 130M may include a laser that emits a beam of light in a direction toward another sensor 130G. The sensor signals directed to the onboard and/or off-board controllers may determine a position of the pin, the hook, the handle, the screw, or the like, based on the light being received by the sensor 130J (e.g., a light is open between the two sensors such that there is a direct line of sight between the laser and receiving sensor) or the light not being received by the sensor (e.g., the light is blocked between laser and receiving sensor). For example, if the sensor 130J receives the light beam, the sensor signal indicates that the hook may be in the upright position. Alternatively, the sensor signal may indicate that the hook may be in the transverse position. The processors may determine a state of the monitoring device based on the line of sight between the sensors being open or closed.

As another example, sensors 130P, 130Q may be pressure sensors. One or more of the sensors 130P, 130Q may generate and communicate sensor signals to the onboard and/or off-board controller responsive to the hook being in contact with the inside upper lip 228 of the coupler device and/or the pad 260 being in contact with the side wall 226 of the coupler device.

As another example, a sensor 130D coupled with the hose connection 246 may generate and communicate sensor signals that indicate that the hose connection is coupled with the brake line hose connection 238 of the vehicle system. For example, the sensor 130D may sense or otherwise detect that the hose connection is receiving brake fluid via the brake line hose connection. Optionally, the sensor signal may indicate that the sensor 130D is within a proximity to a sensor 130E coupled with the brake line hose connection.

The processors of the onboard controller and/or the off-board controller may receive sensor signals from one or more of the sensors in order to determine a state of the mounting assembly based on the information obtained from the sensors. In one or more embodiments, the processors may determine the status of the vehicle signaling and monitoring device based on correlating data received from one or more sensors associated with different parts of the device, the mounting assembly, the storage facility, the vehicle, or the like. For example, the status of the monitoring device may be based on data associated with the mounting assembly, a position of the device (locked, unlocked, geographic, etc.) combinations of two or more therein, analyzing movement patterns (of the vehicle system, of the device, or the like) over time, or the like.

In embodiments, the one or more processors may be configured to receive information from the one or more sensors (coupled to the device and/or vehicle system) about one or more of the mounting assembly or position of the device (e.g., latitude/longitude/altitude, position relative to other known positions, etc.) In one aspect, the one or more processors are configured to determine a state of the device (e.g., coupled to a vehicle for use, or not coupled to a vehicle for use) based on the information of the mounting assembly (e.g., actuated or not actuated). In another aspect, the one or more processors are configured to determine a state of the device based on the information of the mounting assembly and the position information. In another aspect, the one or more processors may be configured to determine the state of the device, based on the mounting assembly and the position, by determining if multiple instances of the position information over time meet one or more designated criteria, in an absolute sense (e.g., moved vs. not moved) and/or relative to position information of the vehicle system and/or relative to the mounting assembly information. For example, the one or more processors may be configured to determine that the device is not coupled to a vehicle system for use if, despite the mounting assembly having been actuated, the device was not moved during a designated time threshold ahead of when the mounting assembly was actuated. In another example, the one or more processors may be configured to determine the state of the device based on multiple instances of position information (of the device, and/or the device relative to a vehicle system) over time (alone or in conjunction with mounting assembly information) that meet designated criteria of devices being moved from an off-board location to an on-board location for use (e.g., the criteria determined based on previous empirical observations, or otherwise).

In one or more embodiments, the state of the mounting assembly may be based on one or more of a position of the handle, a position of the hook, a position of the jaw member. The processors may determine the state of the mounting assembly by determining whether the mounting assembly is in a locked position, whether the mounting assembly is in an unlocked position, or determining a location of the mounting assembly relative to the vehicle system (e.g., coupled with the vehicle system, moving with the vehicle system, separate from a vehicle system, or the like).

In one or more embodiments, some of the information obtained from the sensors may include information about movement of the hook in one or more directions (e.g., inward and outward, transverse and upright, or the like) relative to the jaw member. For example, the hook may move between plural unloaded positions and a fully loaded position. The processors may determine if the hook is in the fully loaded position or if the hook is in one of the unloaded positions. In one or more embodiments, the processors may determine the state of the mounting assembly based on an amount of time between the hook being in the fully loaded position and the hook being in one of the plural unloaded positions. If an amount of time exceeds a predetermined threshold, the processors may determine that the mounting assembly has gradually, over time, become lose. For example, the processors may determine if the mounting assembly is no longer in a fully loaded position and may be slipping off of the vehicle system. The processors may alert an operator that the vehicle signaling and monitoring device needs to be checked, re-attached to the vehicle system, tightened onto the vehicle system, or the like.

In one or more embodiments, the onboard and/or off-board controllers may determine whether the vehicle signaling and monitoring device is coupled with the vehicle system, or determine that the monitoring device is not coupled with the vehicle system. For example, the processors may determine that the monitoring device is coupled with the vehicle system responsive to receiving sensor signals from sensors of the monitoring device and other sensors of the vehicle system, and correlating the information obtained from the different sensors. The sensor signals may include propulsion and/or braking information of the vehicle system that is correlated with sensor signals including information that the mounting assembly is in a locked position. The correlation may indicate that the monitoring device is coupled with a vehicle system, and the vehicle system may be moving along the route. For example, the processors may determine the state of the mounting assembly to be coupled with the vehicle system and in the locked position. As another example, sensors of the monitoring device may be in communication with proximity sensors of the vehicle system, and the processors may determine that the mounting assembly is coupled with a stationary or mobile vehicle system.

In one or more embodiments, the processors may determine that the mounting assembly including the vehicle signaling and monitoring device is disposed off-board the vehicle system. For example, the sensor signals may indicate that the monitoring device may be in a locked or unlocked position, but in proximity to one or more sensors of a storage facility or warehouse. The processors may determine the state of the monitoring device to be available for use by another vehicle system.

For example, one technical problem of existing systems is an inability to quickly and easily track large volumes (e.g., hundreds) of these monitoring devices. The devices may only report locations when the devices are activated. The devices may be deactivated when not in use and cannot report locations while deactivated. Additionally, tracking relies on human operators to record and report current locations, but given the large numbers of devices and frequent swapping out of devices, locations and statuses are rarely tracked or recorded accurately or in a timely manner. The present invention solves at least this technical problem by generating and communicating sensor signals that may be used to determine a state of plural different monitoring devices. The sensor signals may be generated by sensors coupled with or disposed within the plural different monitoring devices. Optionally, the sensor signals of the sensors of the monitoring devices may be correlated with sensor signals of other sensors, such as other sensors onboard different vehicle systems, other sensors at storage facilities, other sensors of coupler devices that may couple the monitoring devices to vehicle systems, or the like. The onboard and/or off-board controllers may determine states of the plural different monitoring devices based on the different sensor signals, and may communicate the states of the plural different devices with an operator. For example, the controllers may determine the states of 10 different monitoring devices, 100 different devices, 1,000 different devices, or the like.

In one or more embodiments, the processors may determine that the monitoring device is in proximity to one or more sensors of the storage facility, and also receive sensor signals indicating that the monitoring system is in need of maintenance, repair, or the like. Therefore, the processors may determine the state of the monitoring device unavailable for use by a vehicle system.

In one or more embodiments, the processors may communicate or display to one or more operators onboard and/or off-board the vehicle system how many vehicle signaling and monitoring devices may be available for use and stored at a storage facility. Optionally, the processors may communicate or display to one or more operators onboard and/or off-board the vehicle system how many vehicle signaling and monitoring devices may be available for use and stored at a storage facility, but are unavailable due to the need for maintenance and/or repair. As one example, the onboard and/or off-board controller may determine that ten (10) different monitoring devices are coupled with ten different vehicle systems and that forty (40) monitoring devices are not coupled with any vehicle system and are disposed within a storage facility. The onboard and/or off-board controllers may also communicate to one or more operators that five (5) of the stored monitoring devices need repair or maintenance, and that the remaining thirty-five (35) are available for use. Optionally, the controllers may communicate that of the remaining thirty-five devices that are available for use, five (5) have been assigned to other vehicle systems and are not available for use. The onboard and/or off-board controller may communicate to the operator a location of each available and/or unavailable monitoring device, an identification of each of the available and/or unavailable devices, or the like.

Figure 9:
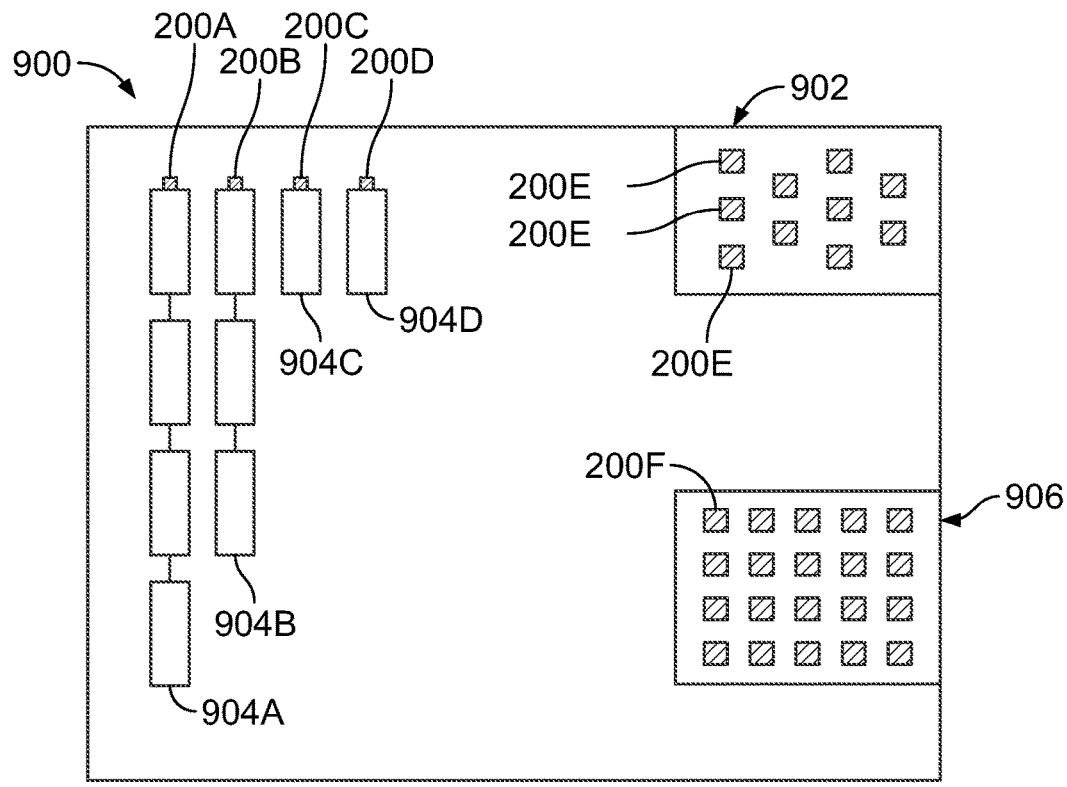
FIG. 9 illustrates plural vehicle signaling and monitoring devices in accordance with one embodiment.

For example, FIG. 9 illustrates plural vehicle signaling and monitoring devices in accordance with one embodiment. The monitoring devices may be stored, held, or positioned within a facility 900 such as a warehouse, storage facility, rail yard, or the like. The one or more processors of the onboard and/or off-board controllers may receive sensor signals from each of the monitoring devices and/or one or more sensors of the facility 900, and may determine a state of each of the monitoring devices. The controllers may determine which monitoring devices, and how many monitoring devices are assigned to vehicle systems, which and/or how many monitoring devices are being repaired, and which and/or how many monitoring devices are available for use.

The controllers may determine that the monitoring devices 200A-D are in use by vehicle systems 904A-D. The controllers may communicate, display, or otherwise indicate to an operator that the four monitoring devices 200A-D are not available, may indicate an identification of each of the four monitoring devices, or the like. Optionally, the controllers may indicate to the operator that the monitoring devices are unavailable because the monitoring devices 200A-D are presently in use. Additionally or alternatively, the controllers may communicate, display, or otherwise indicate to the operator that ten (10) monitoring devices 200E are disposed in a repair area 902. For example, the controllers may indicate that the ten monitoring devices 200E are unavailable, may indicate an identification of each of the ten unavailable monitoring devices, and/or may indicate that the ten unavailable monitoring devices are unavailable because the ten devices are in need of repair. Additionally or alternatively, the controllers may determine and communicate, display, or otherwise indicate to the operator that twenty (20) monitoring devices 200F are disposed in a storage area 906 and are available for use. Optionally, the controllers may indicate an identification of each of the twenty available monitoring devices.

In embodiments, the one or more sensors of the device/system (e.g., end-of-vehicle device) include a GPS (global positioning system) sensor. The GPS sensor (e.g., GPS receiver) is configured to receive wireless signals from GPS satellites, with the wireless signals containing information for the GPS sensor to determine its approximate geographic location. The device also includes one or more of a transmitter and/or an energy storage device. The transmitter may be configured to transmit the determined geographic location to a remote location, e.g., a dispatch or maintenance center. The energy storage device may be configured to provide electrical power to the GPS sensor and transmitter even during times when the device is not attached to a vehicle, for determining a location of the device at the remote location, e.g., if the device is stolen, lost, or misplaced.

In one or more embodiments, a system may include a mounting assembly disposed onboard a vehicle system. The mounting assembly couples a vehicle signaling and monitoring device to the vehicle system. One or more sensors may obtain information related to one or more of the mounting assembly or the vehicle system. One or more processors may determine a state of the mounting assembly based on the information obtained by the one or more sensors.

Optionally, the mounting assembly may include a first member and a second member. The first member may move relative to the second member with actuation of a handle to couple the mounting assembly with the vehicle system.

Optionally, the one or more processors may determine the state of the mounting assembly based on one or more of a position of the handle, a position of the first member, or a position of the second member.

Optionally, the information related to the mounting assembly may include movement of the first member in one or more directions relative to the second member.

Optionally, the hook may move between plural unloaded positions and a fully loaded position. The one or more processors may determine if the first member is in the fully loaded position or if the first member is in one of the unloaded positions.

Optionally, the one or more processors may determine the state of the mounting assembly based on amount of time between the first member being in one of the plural unloaded positions and the first member being in the fully loaded position.

Optionally, the one or more processors may determine the state of the mounting assembly by one or more of determining whether the mounting assembly is in a locked position, determining whether the mounting assembly is in an unlocked position, or determining a location of the mounting assembly relative to the vehicle system.

Optionally, the first member may be or comprise a hook and the second member may be or comprise a jaw member. The hook may move relative to the jaw member with actuation of the handle to couple the mounting assembly with the vehicle system.

Optionally, the one or more processors may determine if the mounting assembly is coupled with the vehicle system or if the mounting assembly is not coupled with the vehicle system.

Optionally, the one or more processors may receive sensed information from one or more other sensors of the vehicle system. The one or more processors may determine if the mounting assembly is coupled with the vehicle system based at least in part on the sensed information from the one or more other sensors of the vehicle system.

Optionally, the one or more processors may correlate the information obtained from the one or more sensors with the sensed information from the one or more other sensors of the vehicle system.

Optionally, the one or more sensors may include one or more of position sensors, pressure sensors, light sensors, accelerometers, or magnetic sensors.

Optionally, the one or more processors may be disposed off-board the vehicle system.

In one or more embodiments, a method may include obtaining information related to one or more of a mounting assembly or a vehicle system with one or more sensors coupled with one or more of the mounting assembly or the vehicle system. The mounting assembly may be disposed onboard the vehicle system. The mounting assembly may couple a vehicle signaling and monitoring device to the vehicle system. The method may include determining a state of the mounting assembly based on the information obtained by the one or more sensors.

Optionally, the mounting assembly may include a first member and a second member. The first member may move relative to the second member with actuation of a handle to couple the mounting assembly with the vehicle system.

Optionally, the method may include determining the state of the mounting assembly based on one or more of a position of the handle, a position of the first member, or a position of the second member.

Optionally, the information related to the mounting assembly may include movement of the first member in one or more directions relative to the second member.

Optionally, the first member may move between plural unloaded positions and a fully loaded position. The method may include determining if the first member is in the fully loaded position or if the first member is in one of the unloaded positions.

Optionally, determining the state of the mounting assembly may include determining whether the mounting assembly is in a locked position, determining whether the mounting assembly is in an unlocked position, or determining a location of the mounting assembly relative to the vehicle system.

Optionally, the method may include determining if the mounting assembly is coupled with the vehicle system or if the mounting assembly is not coupled with the vehicle system.

In one or more embodiments, a system includes an end-of-vehicle device having a housing, a monitoring device disposed in the housing and configured to monitor one or more of a vehicle system or a route along which the vehicle system moves, and a mounting assembly attached to the housing and configured to couple the housing to an exterior end of the vehicle system. One or more sensors may be coupled to the end-of-vehicle device, may generate sensor signals and may communicate the sensor signals with one or more processors. The sensor signals may include information about the end-of-vehicle device for the one or more processors to determine a state of the end-of-vehicle device based on the information.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a mounting assembly configured to be coupled with a vehicle system to transferably couple a vehicle signaling and monitoring device to an exterior portion of the vehicle system, the mounting assembly including a first member and a second member, the first member configured to move relative to the second member to couple the mounting assembly with the vehicle system;
one or more sensors configured to obtain information related to one or more of the mounting assembly or the vehicle system; and
one or more processors configured to determine a state of the mounting assembly and a location of the vehicle signaling and monitoring device based on the information obtained by the one or more sensors, the one or more processors configured to communicate one or more of the state of the mounting assembly or the location of the vehicle signaling and monitoring device with a remote location.

2. The system of claim 1, wherein the first member is configured to move relative to the second member with actuation of a handle to couple the mounting assembly with the vehicle system.

3. The system of claim 2, wherein the one or more processors are configured to determine the state of the mounting assembly based on one or more of a position of the handle, a position of the first member, or a position of the second member.

4. The system of claim 2, wherein the first member comprises a hook and the second member comprises a jaw member, the hook configured to move relative to the jaw member with actuation of the handle to couple the mounting assembly with the vehicle system.

5. The system of claim 1, wherein the information related to the mounting assembly includes movement of the first member in one or more directions relative to the second member.

6. The system of claim 1, wherein the first member is configured to move between plural unloaded positions and a fully loaded position, wherein the one or more processors are configured to determine if the first member is in the fully loaded position or if the first member is in one of the unloaded positions.

7. The system of claim 6, wherein the one or more processors are configured to determine the state of the mounting assembly based on an amount of time between the first member being in one of the plural unloaded positions and the first member being in the fully loaded position.

8. The system of claim 1, wherein the one or more processors are configured to determine the state of the mounting assembly by one or more of determining whether the mounting assembly is coupled with the vehicle system and in a locked position, determining whether the mounting assembly is coupled with the vehicle system and in an unlocked position, or determining the location of the vehicle signaling and monitoring device relative to the vehicle system responsive to determining that the mounting assembly is disconnected from the vehicle system and is being stored at the location.

9. The system of claim 1, wherein the one or more processors are configured to determine if the mounting assembly is coupled with the vehicle system or if the mounting assembly is not coupled with the vehicle system.

10. The system of claim 1, wherein the one or more processors are configured to receive sensed information from one or more other sensors of the vehicle system, wherein the one or more processors are configured to determine if the mounting assembly is coupled with the vehicle system based at least in part on the sensed information from the one or more other sensors of the vehicle system.

11. The system of claim 10, wherein the one or more processors are configured to correlate the information obtained by the one or more sensors with the sensed information from the one or more other sensors of the vehicle system.

12. The system of claim 1, wherein the one or more sensors includes one or more of position sensors, pressure sensors, light sensors, accelerometers, or magnetic sensors.

13. The system of claim 1, wherein the one or more processors are disposed off-board the vehicle system.

14. The system of claim 1, wherein the vehicle signaling and monitoring device is configured to be transferably coupled with the vehicle system via the mounting assembly, the vehicle system including plural vehicles, wherein the vehicle signaling and monitoring device is configured to identify a designation of at least one of the plural vehicles to which the vehicle signaling and monitoring device is transferably coupled.

15. A method comprising:
obtaining information related to one or more of a mounting assembly or a vehicle system with one or more sensors coupled with one or more of the mounting assembly or the vehicle system, the mounting assembly including a first member and a second member, the first member configured to move relative to the second member to couple the mounting assembly with the vehicle system, the mounting assembly configured to transferably couple a vehicle signaling and monitoring device to an exterior portion of the vehicle sy stem;
determining a location of the vehicle signaling and monitoring device relative to the vehicle system based on at least a portion of the information obtained by the one or more sensors;
determining a state of the mounting assembly based on at least a portion of the information obtained by the one or more sensors; and
communicating one or more of the state of the mounting assembly or the location of the vehicle signaling and monitoring device with a remote location.

16. The method of claim 15, wherein the first member is configured to move relative to the second member with actuation of a handle to couple the mounting assembly with the vehicle system.

17. The method of claim 16, further comprising determining the state of the mounting assembly based on one or more of a position of the handle, a position of the first member, or a position of the second member.

18. The method of claim 15, wherein the information related to the mounting assembly includes movement of the first member in one or more directions relative to the second member.

19. The method of claim 15, wherein the first member is configured to move between plural unloaded positions and a fully loaded position, further comprising determining if the first member is in the fully loaded position or if the first member is in one of the unloaded positions.

20. The method of claim 15, wherein determining the state of the mounting assembly includes one or more of determining whether the mounting assembly is coupled with the vehicle system and in a locked position, determining whether the mounting assembly is coupled with the vehicle system and in an unlocked position, or determining the location of the vehicle signaling and monitoring device relative to the vehicle system responsive to a determination that the mounting assembly is disconnected from the vehicle system.

* * * * *